US011363514B2

(12) United States Patent
Lee et al.

(10) Patent No.: US 11,363,514 B2
(45) Date of Patent: Jun. 14, 2022

(54) METHOD AND APPARATUS FOR PERFORMING CONDITIONAL CELL CHANGE BASED ON CHANNEL OCCUPANCY IN WIRELESS COMMUNICATION SYSTEM

(71) Applicant: LG ELECTRONICS INC., Seoul (KR)

(72) Inventors: Youngdae Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/045,448

(22) PCT Filed: Jun. 20, 2019

(86) PCT No.: PCT/KR2019/007450
§ 371 (c)(1),
(2) Date: Oct. 5, 2020

(87) PCT Pub. No.: WO2019/245304
PCT Pub. Date: Dec. 26, 2019

(65) Prior Publication Data
US 2021/0045031 A1 Feb. 11, 2021

Related U.S. Application Data

(60) Provisional application No. 62/688,357, filed on Jun. 21, 2018.

(51) Int. Cl.
*H04W 24/10* (2009.01)
*H04W 36/22* (2009.01)
(Continued)

(52) U.S. Cl.
CPC .......... *H04W 36/22* (2013.01); *H04B 17/318* (2015.01); *H04W 24/10* (2013.01); *H04W 28/0284* (2013.01); *H04W 36/32* (2013.01)

(58) Field of Classification Search
CPC . H04W 36/22; H04W 24/10; H04W 28/0284; H04W 36/32; H04W 36/00835; H04B 17/318
See application file for complete search history.

(56) References Cited

U.S. PATENT DOCUMENTS

| 2005/0277415 A1 | 12/2005 | Hamalainen et al. |
| 2017/0272988 A1 | 9/2017 | Hoidis et al. |
| 2021/0235340 A1* | 7/2021 | Moosavi ........... H04W 36/0088 |

FOREIGN PATENT DOCUMENTS

WO 2017/191615 11/2017

OTHER PUBLICATIONS

PCT International Application No. PCT/KR2019/007450, International Search Report dated Sep. 26, 2019, 2 pages.
(Continued)

*Primary Examiner* — Chuong A Ngo
(74) *Attorney, Agent, or Firm* — Lee Hong Degerman Kang Waimey

(57) ABSTRACT

A method and apparatus for performing a conditional mobility based on a congestion level in a wireless communication system is provided. That is, the congestion level may be considered as mobility triggering condition of the conditional mobility. A wireless device performs a congestion level measurement, and receives a conditional mobility configuration associated with multiple target cells from a serving node. The conditional mobility configuration includes a threshold for the congestion level. The wireless device performs a mobility towards one target cell among the multiple target cells based on a result of the congestion (Continued)

level measurement and the threshold for the congestion level.

13 Claims, 13 Drawing Sheets

(51) Int. Cl.
*H04B 17/318* (2015.01)
*H04W 28/02* (2009.01)
*H04W 36/32* (2009.01)

(56) References Cited

OTHER PUBLICATIONS

LG Electronics Inc., "Conditional handover procedure," 3GPP TSG-RAN2#101, R2-1802693 (Resubmission of R2-1801425), Athens, Greece, Feb. 26-Mar. 2, 2018, 5 pages.
Ericsson, "Conditional handover," 3GPP TSG-RAN WG2 #101, R2-1803336 (Resubmission of R2-1801329), Athens, Greece, Feb. 26-Mar. 2, 2018, 7 pages.
Section 5.5.1 of 3GPP TS 38.331 v15.1.0 (Mar. 2018); TS; 3GPP; TSGRAN; NR; Radio Resource Control (RRC) protocol specification (Release 15); 4 pages.
Section 10.1.2.1 of 3GPP TS 36.300 v15.1.0 (Mar. 2018); TS; 3GPP; TSGRAN; E-UTRA and E-UTRAN; Overall description; Stage 2 (Release 15); 4 pages.

* cited by examiner

METHOD AND APPARATUS FOR PERFORMING CONDITIONAL CELL CHANGE BASED ON CHANNEL OCCUPANCY IN WIRELESS COMMUNICATION SYSTEM

CROSS-REFERENCE TO RELATED APPLICATIONS

This application is the National Stage filing under 35 U.S.C. 371 of International Application No. PCT/KR2019/007450, filed on Jun. 20, 2019, which claims the benefit of U.S. Provisional Application No. 62/688,357, filed on Jun. 21, 2018, the contents of which are all hereby incorporated by reference herein in their entirety.

TECHNICAL FIELD

The present invention relates to wireless communications, and more particularly, to a method and apparatus for performing a conditional cell change based on a channel occupancy in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNodeB (eNB) and user equipment (UE) apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

In $5^{th}$ generation (5G) communication system, it is being discussed to introduce conditional mobility. One example of conditional mobility is conditional handover. The conditional handover splits the handover into two parts: communication with source cell is done early and late with the target cell. The conditional handover is essentially a network-configured but UE-controlled downlink mobility mechanism with a potential to reduce the interruption time and handover failure/radio link failure. The conditional handover improves the handover robustness significantly.

SUMMARY

Like LTE/LTE-A, NR may also introduce operations on unlicensed bands. Conditional mobility may be consider cell quality as mobility triggering conditions. However, if conditional mobility is performed on unlicensed bands, congestion level on the unlicensed bands as well as cell quality should be considered as the mobility triggering conditions.

In an aspect, a method performed by a wireless device in a wireless communication system is provided. The method includes performing a congestion level measurement, receiving a conditional mobility configuration associated with multiple target cells from a serving node. The conditional mobility configuration includes a threshold for the congestion level. The method further includes performing a mobility towards one target cell among the multiple target cells based on a result of the congestion level measurement and the threshold for the congestion level.

In another aspect, a wireless device in a wireless communication system is provided. The wireless device includes a memory, a transceiver, and a processor, operably coupled to the memory and the transceiver. The wireless device is configured to perform, via the processor and the transceiver, a congestion level measurement, receive, via the transceiver, a conditional mobility configuration associated with multiple target cells from a serving node. The conditional mobility configuration includes a threshold for the congestion level. The wireless device is further configured to perform a mobility towards one target cell among the multiple target cells based on a result of the congestion level measurement and the threshold.

In another aspect, a processor for a wireless device in a wireless communication system is provided. The processor is configured to perform a congestion level measurement, control the wireless device to receive a conditional mobility configuration associated with multiple target cells from a serving node. The conditional mobility configuration includes a threshold for the congestion level. The processor is further configured to perform a mobility towards one target cell among the multiple target cells based on a result of the congestion level measurement and the threshold.

Conditional mobility can be performed efficiently by considering congestion level (e.g. channel occupancy) on unlicensed bands.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
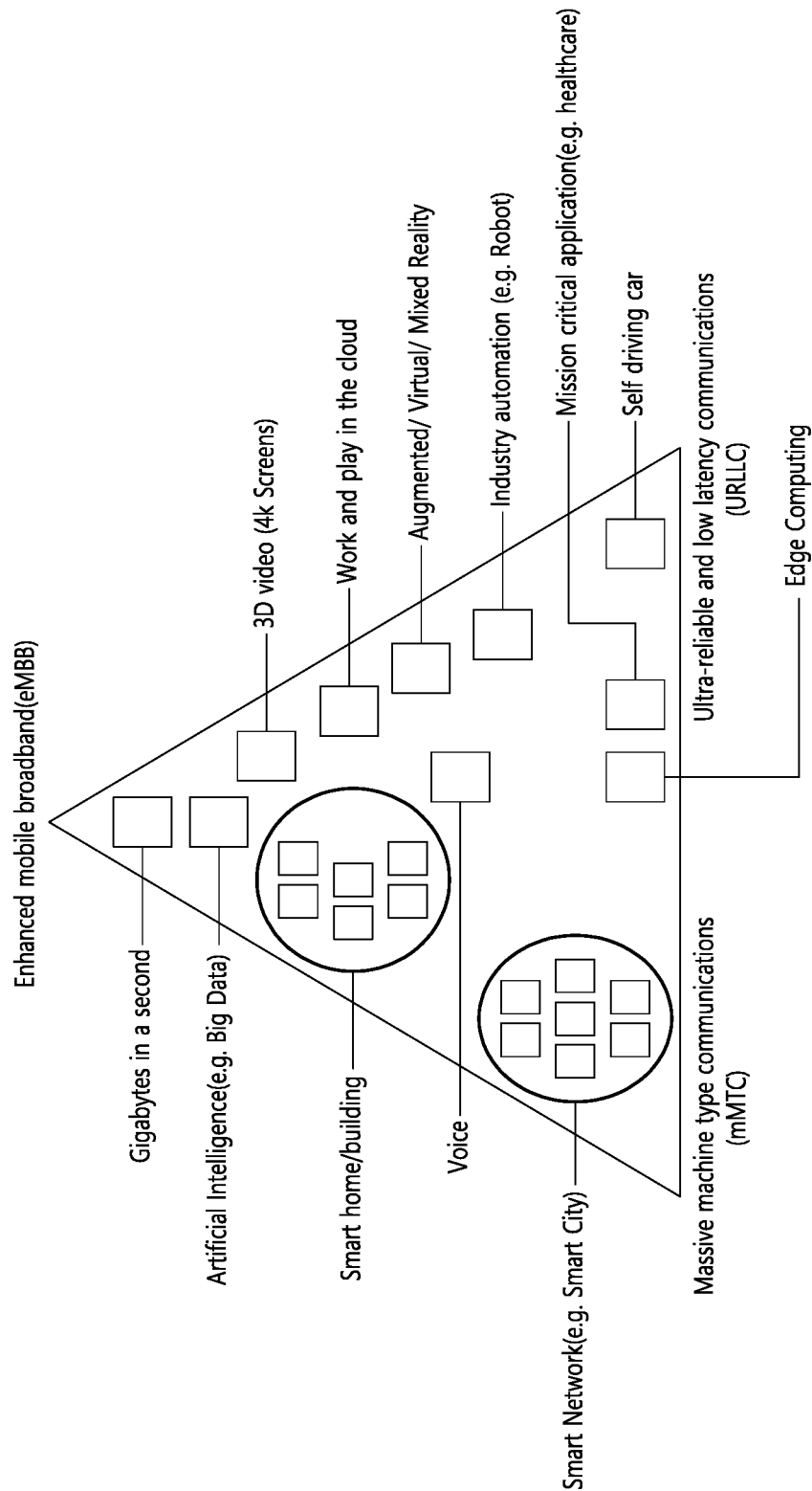
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
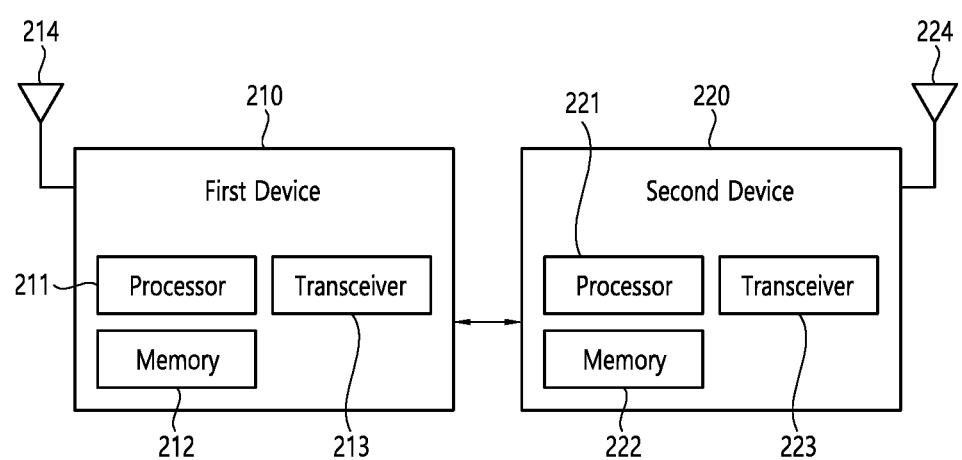
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
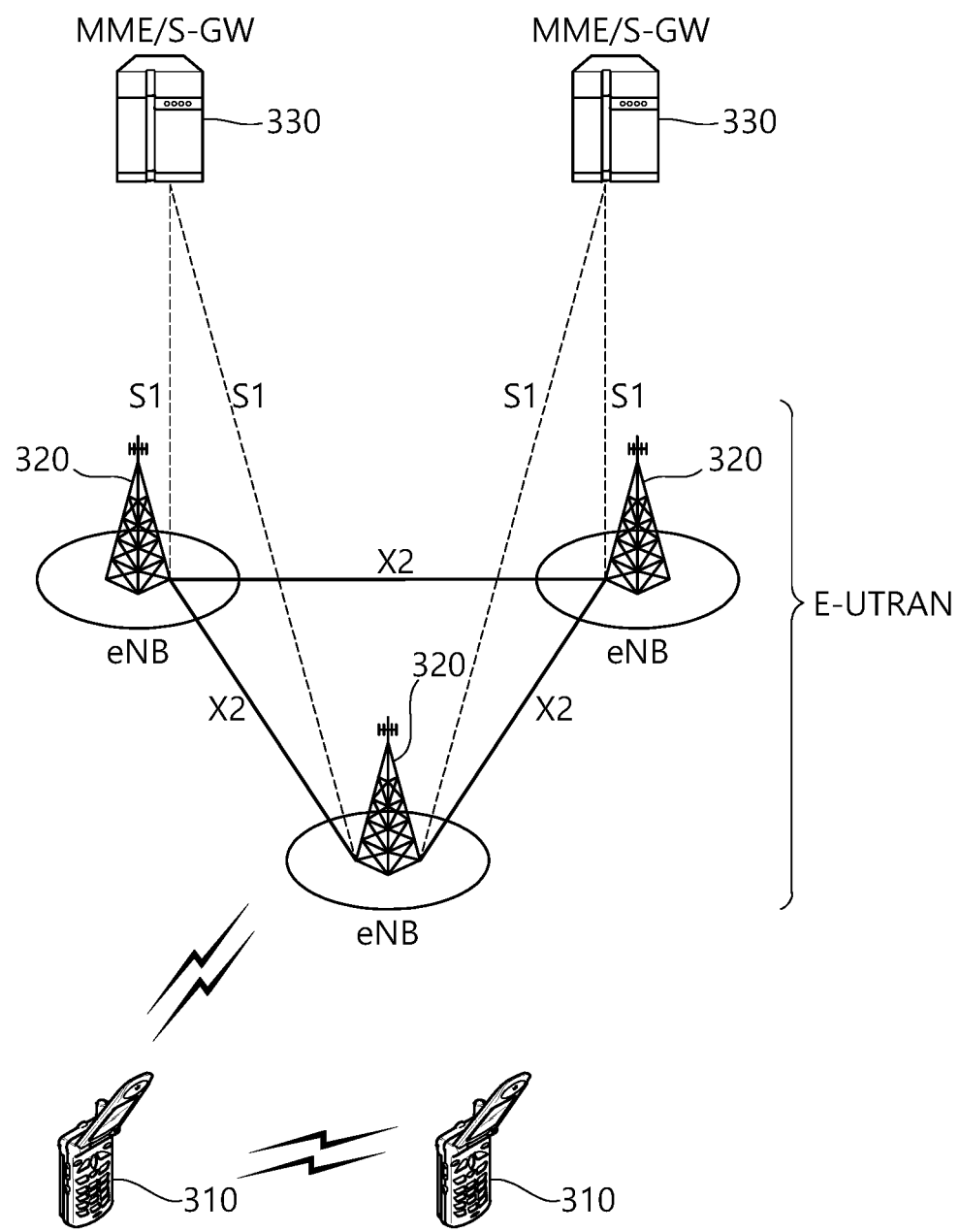
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
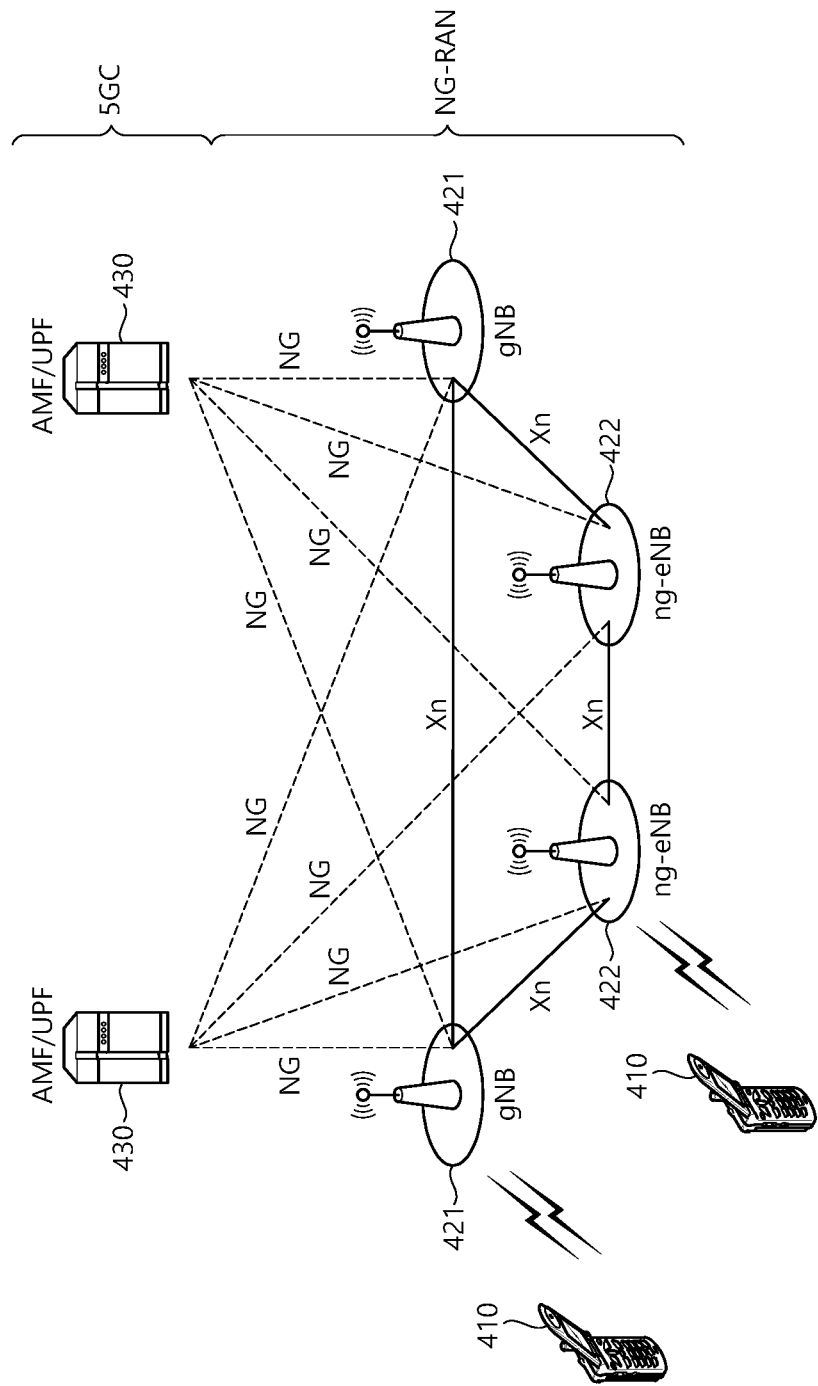
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
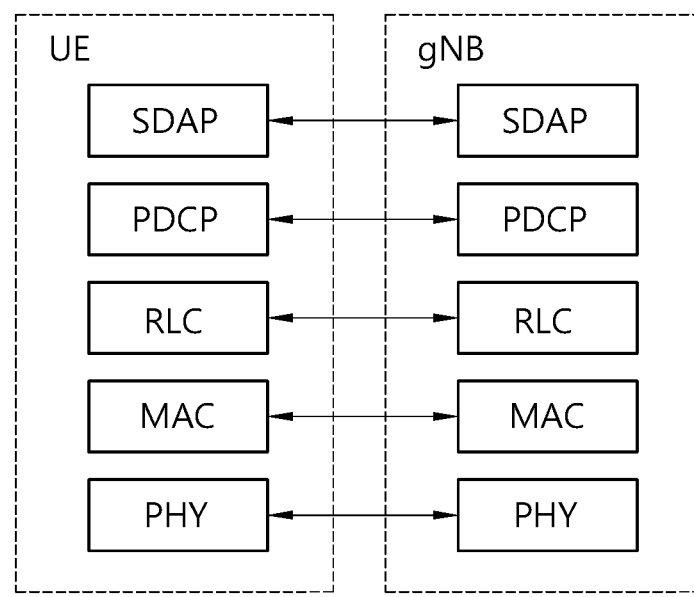
FIG. 5 shows a block diagram of a user plane protocol stack to which the technical features of the present invention can be applied.
Figure 6:
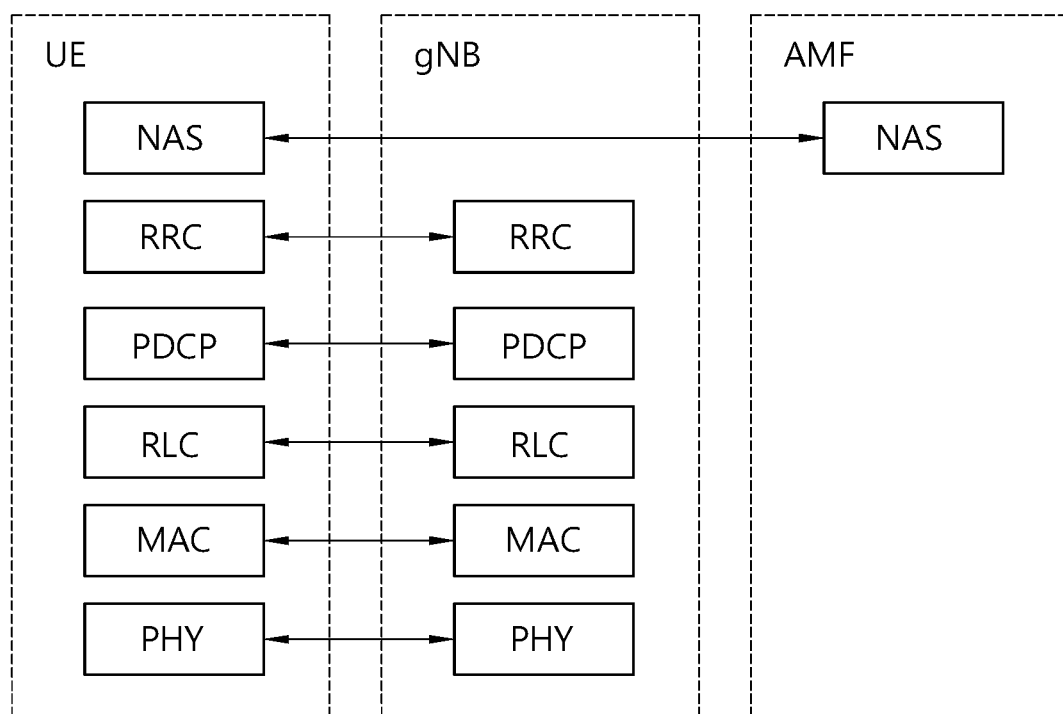
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Handover is described. Section 10.1.2.1 of 3GPP TS 36.300 V15.1.0 (2018-03) may be referred. Handover in LTE/LTE-A is exemplarily described, but the below description regarding handover can be applied to NR without loss of generality. For example, in the description below, eNB/MME/S-GW may be replaced with gNB/AMF/UPF.

The intra E-UTRAN HO of a UE in RRC_CONNECTED state is a UE-assisted network-controlled HO, with HO preparation signaling in E-UTRAN.

Part of the HO command comes from the target eNB and is transparently forwarded to the UE by the source eNB. To prepare the HO, the source eNB passes all necessary information to the target eNB (e.g. E-UTRAN radio access bearer (E-RAB) attributes and RRC context). When carrier aggregation (CA) is configured and to enable secondary cell (SCell) selection in the target eNB, the source eNB can provide in decreasing order of radio quality a list of the best cells and optionally measurement result of the cells. When dual connectivity (DC) is configured, the source master eNB (MeNB) provides the secondary cell group (SCG) configuration (in addition to the master cell group (MCG) configuration) to the target MeNB. Both the source eNB and UE keep some context (e.g. cell radio network temporary identity (C-RNTI)) to enable the return of the UE in case of HO failure. If RACH-less HO is not configured, the UE accesses the target cell via RACH following a contention-free procedure using a dedicated RACH preamble or following a contention-based procedure if dedicated RACH preambles are not available. The UE uses the dedicated preamble until the HO procedure is finished (successfully or unsuccessfully). If RACH-less HO is configured, the UE accesses the target cell via the UL grant pre-allocated to the UE in the RRC message. If the UE does not receive the pre-allocated UL grant in the RRC message from the source eNB, the UE monitors the PDCCH of the target cell. If the access towards the target cell (using RACH or RACH-less procedure) is not successful within a certain time, the UE initiates radio link failure (RLF) recovery using a suitable cell. No robust header compression (ROHC) context is transferred at HO. ROHC context can be kept at HO within the same eNB.

Figure 7:
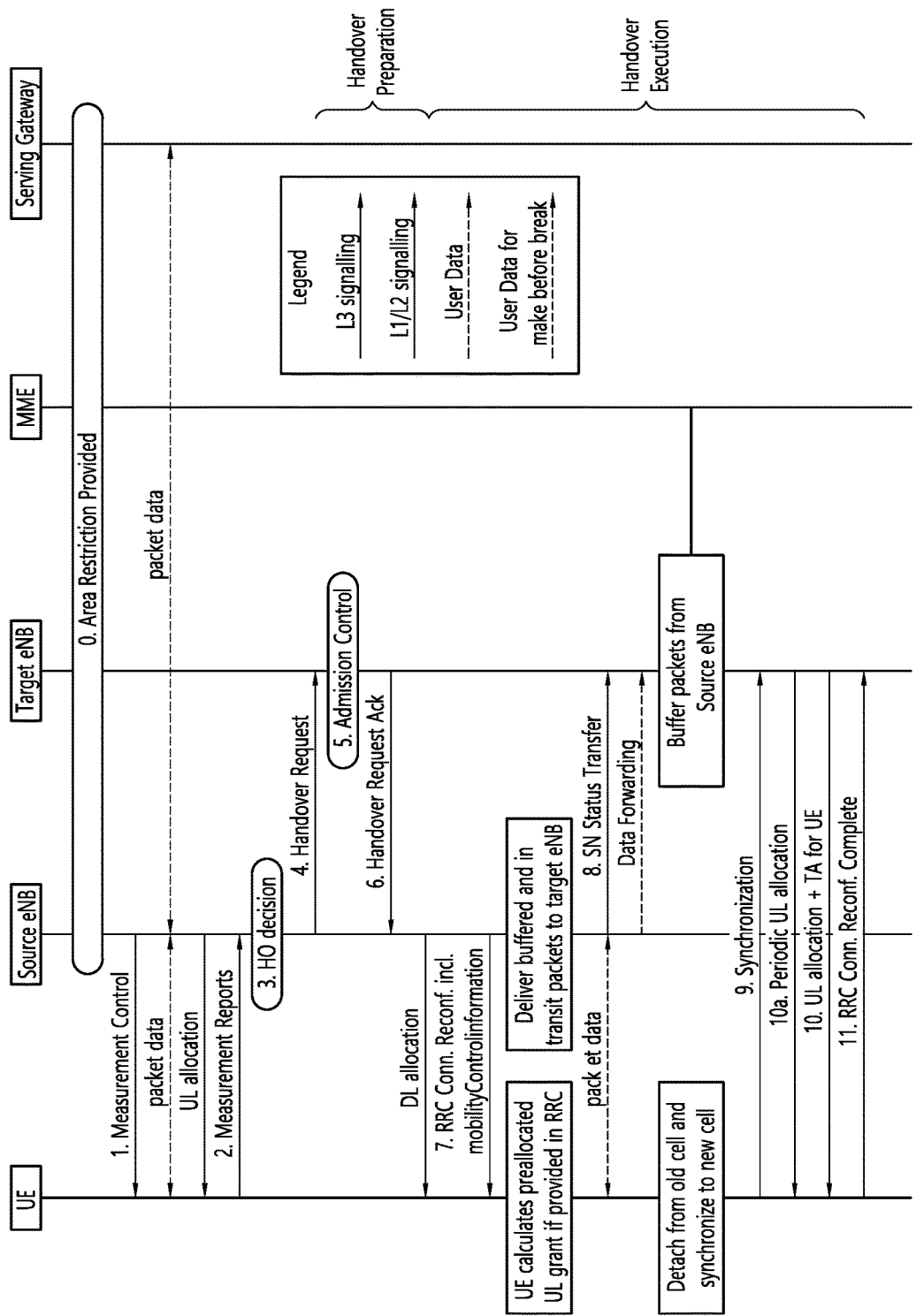
FIG. 7 shows intra-MME/S-GW HO to which the technical features of the present invention can be applied.

FIG. 7 shows intra-MME/S-GW HO to which the technical features of the present invention can be applied.

FIG. 7 describes control plane (C-plane) handling in intra-MME/S-GW HO. The preparation and execution phase of the HO procedure is performed without EPC involvement, i.e. preparation messages are directly exchanged between the eNBs. The release of the resources at the source side during the HO completion phase is triggered by the eNB. FIG. 7 only shows HO preparation and execution phases, but does not show HO completion phase. Below is a more detailed description of the intra-MME/S-GW HO.

Steps 0 to 6 belong to the HO preparation phase.

Step 0: The UE context within the source eNB contains information regarding roaming and access restrictions which were provided either at connection establishment or at the last TA update.

Step 1: The source eNB configures the UE measurement procedures according to the roaming and access restriction information and e.g. the available multiple frequency band information. Measurements provided by the source eNB may assist the function controlling the UE's connection mobility.

Step 2: A MEASUREMENT REPORT is triggered and sent to the eNB.

Step 3: The source eNB makes decision based on MEASUREMENT REPORT and radio resource management (RRM) information to hand off the UE.

Step 4: The source eNB issues a HANDOVER REQUEST message to the target eNB passing necessary information to prepare the HO at the target side (UE X2 signaling context reference at source eNB, UE S1 EPC signaling context reference, target cell ID, $K_{eNB*}$, RRC context including the C-RNTI of the UE in the source eNB, AS-configuration, E-RAB context and physical layer ID of the source cell+short MAC-I for possible RLF recovery). UE X2/UE S1 signaling references enable the target eNB to address the source eNB and the EPC. The E-RAB context includes necessary radio network layer (RNL) and transport network layer (TNL) addressing information, and quality of service (QoS) profiles of the E-RABs.

Step 5: Admission control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Step 6: The target eNB prepares HO with L1/L2 and sends the HANDOVER REQUEST ACKNOWLEDGE message to the source eNB. The HANDOVER REQUEST ACKNOWLEDGE message includes a transparent container to be sent to the UE as an RRC message to perform the HO. The container includes a new C-RNTI, target eNB security algorithm identifiers for the selected security algorithms, may include a dedicated RACH preamble, and possibly some other parameters i.e. access parameters, system information blocks (SIBs), etc. If RACH-less HO is configured, the container includes timing adjustment indication and optionally a pre-allocated UL grant. The HANDOVER REQUEST ACKNOWLEDGE message may also include RNL/TNL information for the forwarding tunnels, if necessary.

As soon as the source eNB receives the HANDOVER REQUEST ACKNOWLEDGE, or as soon as the transmission of the HO command is initiated in the DL, data forwarding may be initiated.

Steps 7 to 11 belong to the HO execution phase. Steps 7 to 11 and the HO completion phase (not shown) provide means to avoid data loss during HO.

Step 7: The target eNB generates the RRC message to perform the HO, i.e. RRCConnectionReconfiguration message including the mobilityControlInformation, to be sent by the source eNB towards the UE. The source eNB performs the necessary integrity protection and ciphering of the message.

The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. If RACH-less HO is configured, the RRCConnectionReconfiguration includes timing adjustment indication and optionally pre-allocated UL grant for accessing the target eNB. If pre-allocated UL grant is not included, the UE should monitor PDCCH of the target eNB to receive a UL grant. The UE does not need to delay the HO execution for delivering the HARQ/ARQ responses to source eNB.

If Make-Before-Break HO is configured, the connection to the source cell is maintained after the reception of RRCConnectionReconfiguration message with mobilityControlInformation before the UE executes initial UL transmission to the target cell. If Make-Before-Break HO is configured, the source eNB decides when to stop transmitting to the UE. The UE can be configured with Make-Before-Break HO and RACH-less HO simultaneously.

Step 8: The source eNB sends the SN STATUS TRANSFER message to the target eNB to convey the UL PDCP sequence number (SN) receiver status and the DL PDCP SN transmitter status of E-RABs for which PDCP status preservation applies (i.e. for RLC acknowledged mode (AM)). The UL PDCP SN receiver status includes at least the PDCP SN of the first missing UL SDU and may include a bit map of the receive status of the out of sequence UL SDUs that the UE needs to retransmit in the target cell, if there are any such SDUs. The DL PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

Step 9: If RACH-less HO is not configured, after receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

If RACH-less HO is configured, UE performs synchronisation to target eNB. UE derives target eNB specific keys and configures the selected security algorithms to be used in the target cell.

Step 10: If RACH-less HO is not configured, the target eNB responds with UL allocation and timing advance.

Step 10a: If RACH-less HO is configured and the UE did not get the periodic pre-allocated UL grant in the RRCConnectionReconfiguration message including the mobilityControlInfo, the UE receives UL grant via the PDCCH of the target cell. The UE uses the first available UL grant after synchronization to the target cell.

Step 11: When the RACH-less HO is not configured and the UE has successfully accessed the target cell, the UE sends the RRCConnectionReconfigurationComplete message (C-RNTI) to confirm the HO, along with a UL buffer status report (BSR), whenever possible, to the target eNB, which indicates that the HO procedure is completed for the UE. The target eNB verifies the C-RNTI sent in the RRCConnectionReconfigurationComplete message. The target eNB can now begin sending data to the UE.

When the RACH-less HO is configured, after the UE has received UL grant, the UE sends the RRCConnectionReconfigurationComplete message (C-RNTI) to confirm the HO, along with an UL BSR, whenever possible, to the target eNB. The target eNB verifies the C-RNTI sent in the RRCConnectionReconfigurationComplete message. The target eNB can now begin sending data to the UE. The HO procedure is completed for the UE when the UE receives the UE contention resolution identity MAC control element (CE) from the target eNB.

Conditional HO is described. Conditional HO is one aspect of conditional mobility. Conditional mobility including conditional HO can be applied to both LTE/LTE-A HO and NR HO.

For conditional HO, UE may report many cells or beams as the possible candidate HO targets based on the RRM measurement. The network issues the conditional HO commands for one or multiple candidates reported by UE. Within the conditional HO configuration, the candidate(s) may be configured with different HO conditions (including the to-be-measured RS and the threshold) and possibly UL access resources for UE access (e.g. random access preambles).

Figure 8:
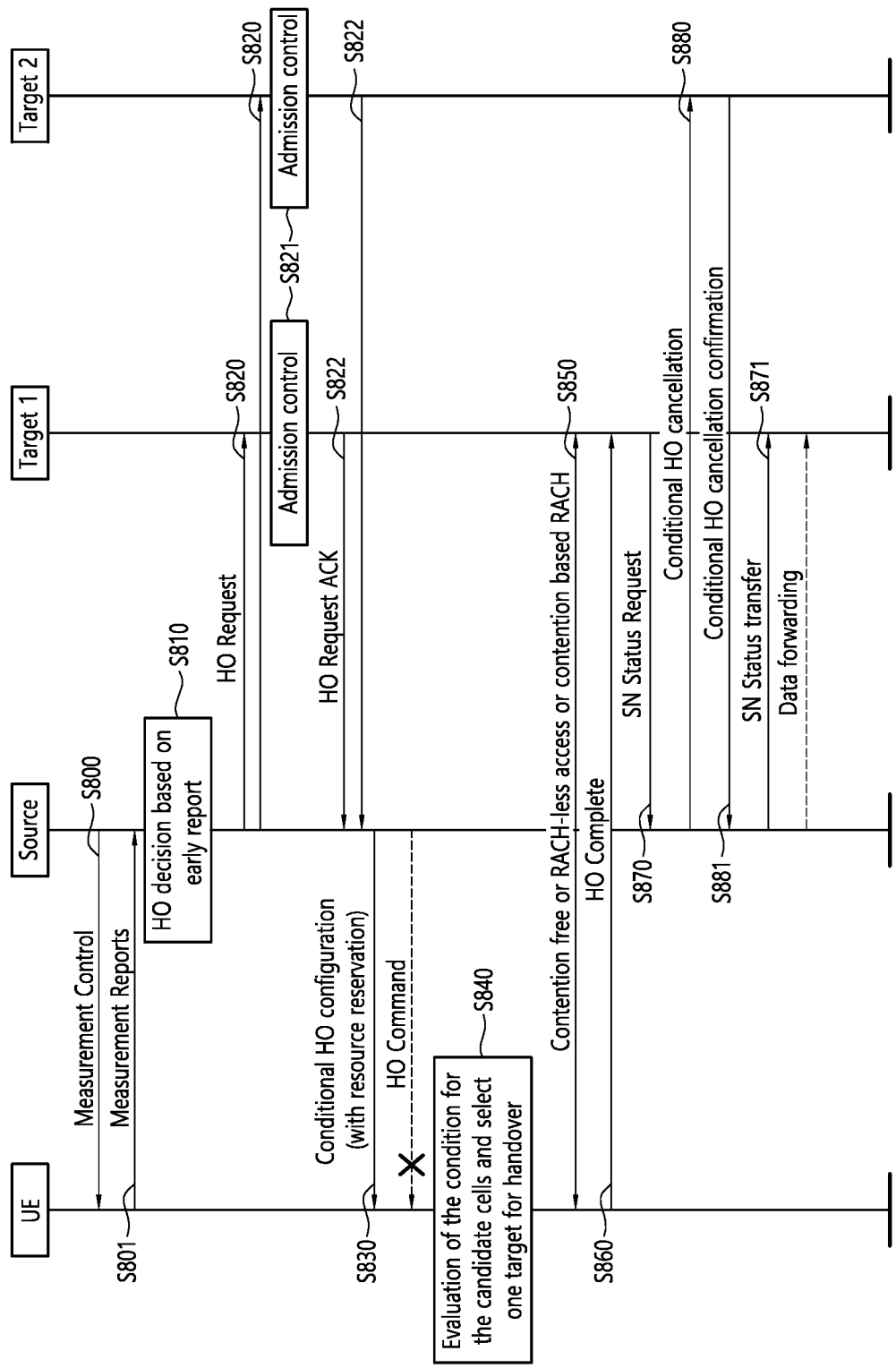
FIG. 8 shows an example of a conditional HO procedure with two target cells to which the technical feature of the present invention can be applied.

FIG. 8 shows an example of a conditional HO procedure with two target cells to which the technical feature of the present invention can be applied.

In step S800, the UE receives a measurement control from the source node. In step S801, the UE transmits measurement reports (i.e. early report) to the source node.

In step S810, the source node performs HO decision based on the early report from the UE. The source node needs to prepare the HO with one or multiple cells, e.g. requesting the candidate target cell(s) to do admission control and reserve the radio resources accordingly. In step S820, the source node transmits the HO Request message to the target node 1 and target node 2. In step S821, each of the target node 1 and target node 2 performs admission control. In step S822, each of the target node 1 and target node 2 transmits the HO Request Acknowledge message which may include a conditional HO command to the source node.

In step S830, the UE receives a conditional HO configuration. The conditional HO configuration may include the conditional HO commands of the target node 1 and target node 2 with resource reservation. The UE does not receive separate HO command from the source node.

Upon receiving the conditional HO configuration, in step S840, the UE starts evaluating the condition for the candidate cells while continuing operating per its current RRC configuration.

When the UE determines that the condition is fulfilled, the UE disconnects from the serving cell, and applies the conditional HO configuration and access to the target cell. In step S850, the UE performs contention free RACH procedure or RACH-less access or contention based RACH procedure towards the target node 1. In step 860, the target node 1 transmits a HO Complete message to the UE.

There are multiple options (on the exact time point) for the source cell to stop its data transmission with the UE, and to start the data forwarding to the candidate target cells. The source cell will only know the exact target cell for the UE until the target cell indicates this to the source cell when the HO procedure is successfully executed.

In step S870, the target node 1 transmits the SN Status Request message to the source node. In step S871, the source node transmits the SN Status Transfer message to the target node 1.

Furthermore, in step S880, the source node may transmit the conditional HO cancellation message to the target node 2, which is not final target of the conditional HO procedure. In step S881, the target node 2 may transmit the conditional HO cancellation confirmation message to the source node.

The HO condition may not be fulfilled for a longer time period and hence the UE will stay in the source cell. In this case, the source cell must have the possibility to perform further reconfigurations either to change the UE operation in the current serving cell or to command the UE to handover to a suitable target cell.

Conditional HO has some benefits compared to legacy HO as follows.

1. HO Delay Perspective

Measurement and HO decision: In legacy HO, measurement and HO decision are performed before HO preparation. After the eNB receives the measurement report, the eNB can start to decide whether HO is needed. If the radio link becomes worse quickly, the delay caused by measurement report and HO decision may affect HO performing timely. In conditional HO, measure report and handover decision are performed when the radio link is still good. From that point of view, conditional HO can save the delay for measurement report and handover decision. However in conditional HO, the UE still needs to perform measurements without reporting to the network before really performing HO, which also cause some delay.

HO preparation: HO preparation includes handshake between source cell and target cell. The latency of HO preparation also may affect handover performing timely. In conditional HO, HO preparation is moved earlier, and maybe it can be seen there is no HO preparation phase in conditional HO. Therefore, conditional HO can reduce the handover delay for handover preparation. It should be noted that the time for handshaking between source and target is dependent on the latency over the backhaul between the source cell and target cell.

2. RLF Probability Perspective

If the radio link becomes worse and the UE cannot perform HO timely, then RLF may happen. According to the above description, conditional HO can reduce the HO delay. Consequently the RLF probability can be reduced with conditional HO.

Measurement in NR is described. Section 5.5.1 of 3GPP TS 38.331 V15.1.0 (2018-06) may be referred.

The network may configure an RRC_CONNECTED UE to perform measurements and report them in accordance with the measurement configuration. The measurement configuration is provided by means of dedicated signaling, i.e. using the RRCReconfiguration.

The network may configure the UE to perform the following types of measurements:
  NR measurements;
  Inter-RAT measurements of E-UTRA frequencies.

The network may configure the UE to report the following measurement information based on synchronization signal (SS)/physical broadcast channel (PBCH) block(s):
  Measurement results per SS/PBCH block;
  Measurement results per cell based on SS/PBCH block(s);
  SS/PBCH block(s) indexes.

The network may configure the UE to report the following measurement information based on channel state information reference signal (CSI-RS) resources:
  Measurement results per CSI-RS resource;
  Measurement results per cell based on CSI-RS resource(s);
  CSI-RS resource measurement identifiers.

The measurement configuration includes the following parameters:

1. Measurement objects (MOs): A list of objects on which the UE shall perform the measurements.
  For intra-frequency and inter-frequency measurements, a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
  The measObjectId of the MO which corresponds to each serving cell is indicated by servingCellMO within the serving cell configuration.
  For inter-RAT E-UTRA measurements, a measurement object is a single EUTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration consists of the following:
  Reporting criterion: The criterion that triggers the UE to send a measurement report. This can either be periodical or a single event description.
  RS type: The RS that the UE uses for beam and cell measurement results (SS/PBCH block or CSI-RS).
  Reporting format: The quantities per cell and per beam that the UE includes in the measurement report (e.g. reference signal received power (RSRP)) and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting of that measurement type. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements, i.e. no (UL, DL) transmissions are scheduled.

A UE in RRC_CONNECTED maintains a measurement object list, a reporting configuration list, and a measurement identities list according to signaling and procedures. The measurement object list possibly includes NR intra-frequency object(s), NR inter-frequency object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:
1. The NR serving cell(s)—these are the special cell (SpCell) and one or more SCells.
2. Listed cells—these are cells listed within the measurement object(s).
3. Detected cells—these are cells that are not listed within the measurement object(s) but are detected by the UE on the SSB frequency(ies) and subcarrier spacing(s) indicated by the measurement object(s).

For NR measurement object(s), the UE measures and reports on the serving cell(s), listed cells and/or detected cells.

NR operation on unlicensed bands is being discussed. In LTE licensed-assisted access (LAA), a cell on an unlicensed band is not considered as primary cell (PCell), but only as secondary cell (SCell). On the other hand, In NR operation on unlicensed bands, a cell on an unlicensed band can be considered as a PCell.

Regarding mobility on unlicensed bands in NR, the following modifications to mobility-related procedures have been identified.
  Modifications to mobility-related measurements considering limitations to the transmission of reference signals due to listen-before-talk (LBT): Techniques to handle reduced RS (e.g. SS/PBCH block and CSI-RS) transmission opportunities due to LBT failure needs to be considered.
  Modifications to mobility-related measurements and/or triggers considering limitations related to high channel occupancy: Techniques to handle increased interference levels in the unlicensed channel for mobility-related decisions needs to be considered.
  Modifications to mobility-related procedures and/or triggers considering limitations related to the transmission of control plane signaling due to LBT: Whether specific techniques to handle additional signaling delays due to LBT failure are required needs to be considered, if not resolved by general mobility enhancement solutions.

As discussed above, increased interference levels should be also considered to support UE mobility in the unlicensed bands. Thus, mobility-related measurement reporting for operation on unlicensed bands including channel occupancy indication and RSSI measurements may be considered. For example, even if RSRP/reference signal received quality (RSRQ) measurement result on the serving cell is good enough for UE to keep staying at the serving cell, congestion level could be high on the serving frequency. Thus, if the UE reports channel occupancy indication and RSSI measurements, the network could make decision on UE mobility. However, when the congestion level is high, the UE may not successfully transmit measurement result to the network. Therefore, it may be beneficial to support the conditional mobility mechanism for UE mobility on unlicensed bands, because the UE is allowed to trigger mobility to a target cell without measurement report in the conditional mobility mechanism.

Therefore, the conditional mobility mechanism may be applied to UE mobility on unlicensed bands. In unlicensed bands, the UE may need to move from a serving cell to a neighbor cell in inter-frequency due to high congestion level on the serving frequency, even if serving cell quality is still good. This situation could occur even if the UE is stationary or slowly moving around in a house or a building. The source cell and the target cell could belong to the same gNB.

For example, when the UE may perform conditional HO to a target cell, which has good channel quality, on a busy channel in unlicensed bands, the UE may experience LBT failures at the target cell. More generally, even if the UE performs conditional mobility towards a target cell for which mobility triggering condition is met (e.g. cell quality of the target cell is good enough), if the target cell is operated on unlicensed bands of which congestion level is high (e.g. consecutive N number of LBTs fails), the UE cannot provide a good quality of service to a user. Therefore, it will be desirable to consider congestion level as a triggering condition of conditional HO.

Figure 9:
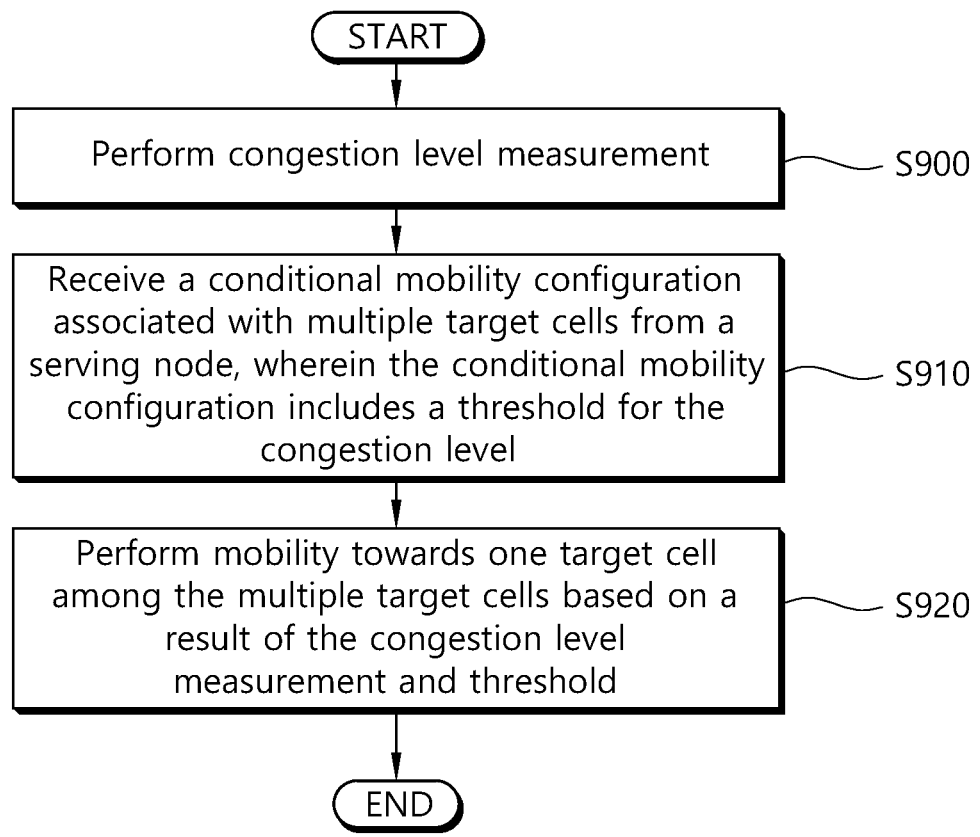
FIG. 9 shows an example of a method for performing a conditional mobility based on a congestion level according to an embodiment of the present invention.

FIG. 9 shows an example of a method for performing a conditional mobility based on a congestion level according to an embodiment of the present invention.

In step S900, the UE performs a congestion level measurement. The congestion level measurement may be performed on at least one of a serving frequency and/or a target frequency. The congestion level measurement may include a received signal strength indicator (RSSI) measurement and/or a channel occupancy measurement. Furthermore, the congestion level measurement may be related to LBT failures. For example, when N consecutive number of LBT failures happens, it may be considered the congestion level is high.

In step S910, the UE receives a conditional mobility configuration associated with multiple target cells from a serving node. The conditional mobility configuration includes a threshold for the congestion level. The conditional mobility configuration associated with multiple target cells may include mobility commands associated with multiple target cells. The conditional mobility configuration may include information on time-to-trigger for the threshold for the congestion level. The conditional mobility configuration may include a threshold for cell quality and information on time-to-trigger for the threshold.

In step S920, the UE performs a mobility towards one target cell among the multiple target cells based on a result of the congestion level measurement and the threshold for the congestion level. The mobility may include a handover to the one target cell and/or a cell addition of the one target cell. The UE may apply a mobility command associated with the one target cell among mobility commands associated with the multiple target cells.

The mobility towards the one target cell may be performed when a condition based on the result of the congestion level measurement and the threshold for the congestion level is met.

1) The condition based on the result of the congestion level measurement and the threshold for the congestion level may be met when a congestion level of the target frequency is lower than the threshold for the congestion level and quality of the one target cell on the target frequency is higher than a threshold for cell quality.

2) The condition based on the result of the congestion level measurement and the threshold for the congestion level may be met when congestion levels of all target frequencies, which includes the target frequency and does not include the serving frequency, is higher than the threshold for the congestion level and quality of the one target cell on the serving frequency is higher than a threshold for cell quality.

3) The condition based on the result of the congestion level measurement and the threshold for the congestion level may be met when a congestion level of the serving frequency is higher than the threshold for the congestion level and quality of the one target cell on the target frequency other than the serving frequency is higher than a threshold for cell quality.

4) The condition based on the result of the congestion level measurement and the threshold for the congestion level may be met when a congestion level of the serving frequency is lower than the threshold for the congestion level and quality of the one target cell on the serving frequency is higher than a threshold for cell quality.

According to the embodiment of the present invention shown in FIG. 9, the congestion level can be considered as mobility triggering condition of the conditional mobility. Therefore, the conditional mobility can be performed on unlicensed bands so as to avoid a frequency of which congestion level is high.

Figure 10:
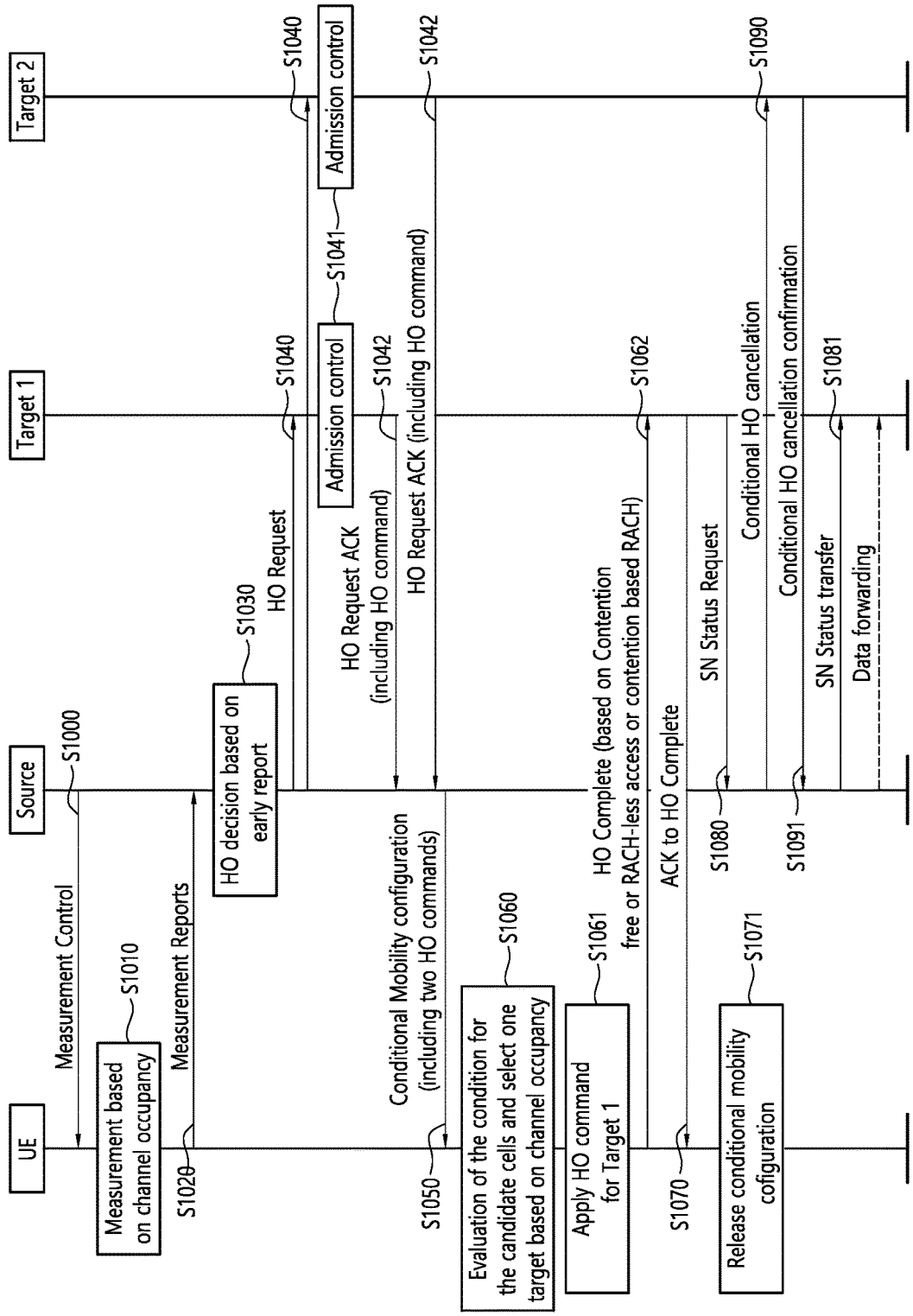
FIG. 10 shows a conditional mobility procedure according to an embodiment of the present invention.

FIG. 10 shows a conditional mobility procedure according to an embodiment of the present invention.

Although this example will be described by way of example of conditional HO for the convenience of description, this example can be applied to conditional mobility, which may include the conditional HO. In this example, the serving node may be either master node (MN) or secondary node (SN). The serving node may be a base station such as gNB or eNB. Furthermore, this example uses a channel occupancy as an example of the congestion level, but the channel occupancy can be generalized as the congestion level which may be related to LBT failures.

In step S1000, the UE receives a measurement configuration from a serving node (i.e. source node). The measurement configuration may include a threshold associated with channel occupancy and a time-to-trigger (TTT) for the threshold associated with the channel occupancy.

In step S1010, the UE performs a measurement based on the received measurement configuration. The UE may perform RSSI measurement on a frequency to evaluate channel occupancy on the frequency. The UE may perform RSRP/RSRQ measurement for a quality of a cell.

Alternatively, while channel occupancy on a frequency is higher than the threshold associated with channel occupancy or channel occupancy of the serving frequency of the serving cell, the UE may prohibit measurement on a target cell on the frequency other than the serving frequency of the serving cell. Alternatively, while channel occupancy on a serving frequency of a serving cell is lower than the threshold associated with channel occupancy or channel occupancy of a non-serving frequency, the UE may prohibit measurement on a target cell on a non-serving frequency.

In step S1020, the UE transmits a measurement reports of the measurement results based on the received measurement configuration.

Alternatively, while channel occupancy on a frequency is higher than the threshold associated with channel occupancy or channel occupancy of the serving frequency of the serving cell, the UE may prohibit measurement report on a target cell on the frequency other than the serving frequency of the serving cell. Alternatively, while channel occupancy on a serving frequency of a serving cell is lower than the threshold associated with channel occupancy or channel occupancy of a non-serving frequency, the UE may prohibit measurement report on a target cell on a non-serving frequency.

In step S1030, the serving node performs HO decision based on the early report from the UE. In step S1040, the source node transmits the HO Request message to multiple target cells. In step S1041, each of the multiple target cells performs admission control. In step S1042, each of the multiple target cells transmits the HO Request Acknowledge message which may include a HO command to the serving node.

In step S1050, the UE receives a conditional mobility configuration from the serving node. The conditional mobility configuration may include handover command(s) associated with one or more target cells and/or one or more target frequencies. The conditional mobility configuration may include mobility triggering information based on channel occupancy. The mobility triggering information may include information on a threshold associated with channel occupancy and TTT for the threshold associated with channel occupancy, and/or information on a threshold associated with cell quality and TTT for the threshold associated with cell quality. The target cells may be on the same frequency or different frequencies on unlicensed band. The mobility may include handover and/or SCG addition.

Then, the UE may perform RSSI measurement on a target frequency to evaluate channel occupancy on the target frequency. The UE may perform RSRP/RSRQ measurement for a quality of the target cell. Alternatively, the serving node may inform the UE of the channel occupancy on the target frequency.

In step S1060, the UE evaluates condition for candidate target cells of the conditional mobility and selects one target cell among the candidate target cells based on channel occupancy. When a condition based on channel occupancy included in the received mobility triggering information has been met for a duration determined by the TTT for the threshold associated with channel occupancy, the UE selects the one target cell and triggers mobility (i.e. handover and/or cell addition) to the selected one target cell.

Examples of the condition based on channel occupancy are as follows.

1) When a channel occupancy of the target frequency is lower than the threshold associated with channel occupancy or channel occupancy of the serving frequency, and quality of the one target cell on the target frequency is higher than the threshold associated with cell quality or the quality of the serving cell;

2) When channel occupancies of all target frequencies other than the serving frequency are higher than the threshold associated with channel occupancy or channel occupancy of the serving frequency, and quality of the one target cell on the serving frequency is higher than the threshold associated cell quality or the quality of the serving cell;

3) When channel occupancy of the serving frequency is higher than the threshold associated the congestion level, and quality of the one target cell on the target frequency other than the serving frequency is higher than the threshold associated cell quality or the quality of the serving cell;

4) When channel occupancy of the serving frequency is lower than the threshold associated with the congestion level, and quality of the one target cell on the serving frequency is higher than the threshold associated with cell quality or the quality of the serving cell.

In other words, while channel occupancy on a frequency is higher than the threshold associated with channel occupancy or channel occupancy of the serving frequency of the serving cell, the UE may prohibit triggering mobility (e.g. conditional handover and/or cell addition) to a target cell on the frequency other than the serving frequency of the serving cell. Or, while channel occupancy on a serving frequency of a serving cell is lower than the threshold associated with channel occupancy or channel occupancy of a non-serving frequency, the UE may prohibit triggering mobility (e.g. conditional handover and/or cell addition) to a target cell on a non-serving frequency.

In step S1061, if the mobility to the selected one target cell is triggered, the UE applies the mobility command associated with the selected one target cell. The UE may synchronize to the selected one target cell, and perform UL transmission to the selected on target cell. In step S1062, the UE performs the UL transmission to send HO complete message or cell addition complete message to the selected one target cell. The UL transmission may be either random access procedure (i.e. based on contention-free RACH procedure or contention-based RACH procedure) or PUSCH transmission (e.g. RACH-less access).

In step S1070, the UE receives acknowledgment or response to the HO complete message or cell addition complete message from the selected one target cell, upon which the UE considers the mobility is successfully completed. In step S1071, the UE release the conditional mobility configuration. The UE may release the handover command(s) not associated with the selected one target cell.

In step S1080, the selected one target cell (i.e. target cell 1) transmits the SN Status Request message to the source cell. In step S1081, the source cell transmits the SN Status Transfer message to the target cell 1.

Furthermore, in step S1090, the source cell may transmit the conditional HO cancellation message to the target cell 2, which is not selected one target cell. In step S1091, the target cell 2 may transmit the conditional HO cancellation confirmation message to the source cell.

Figure 11:
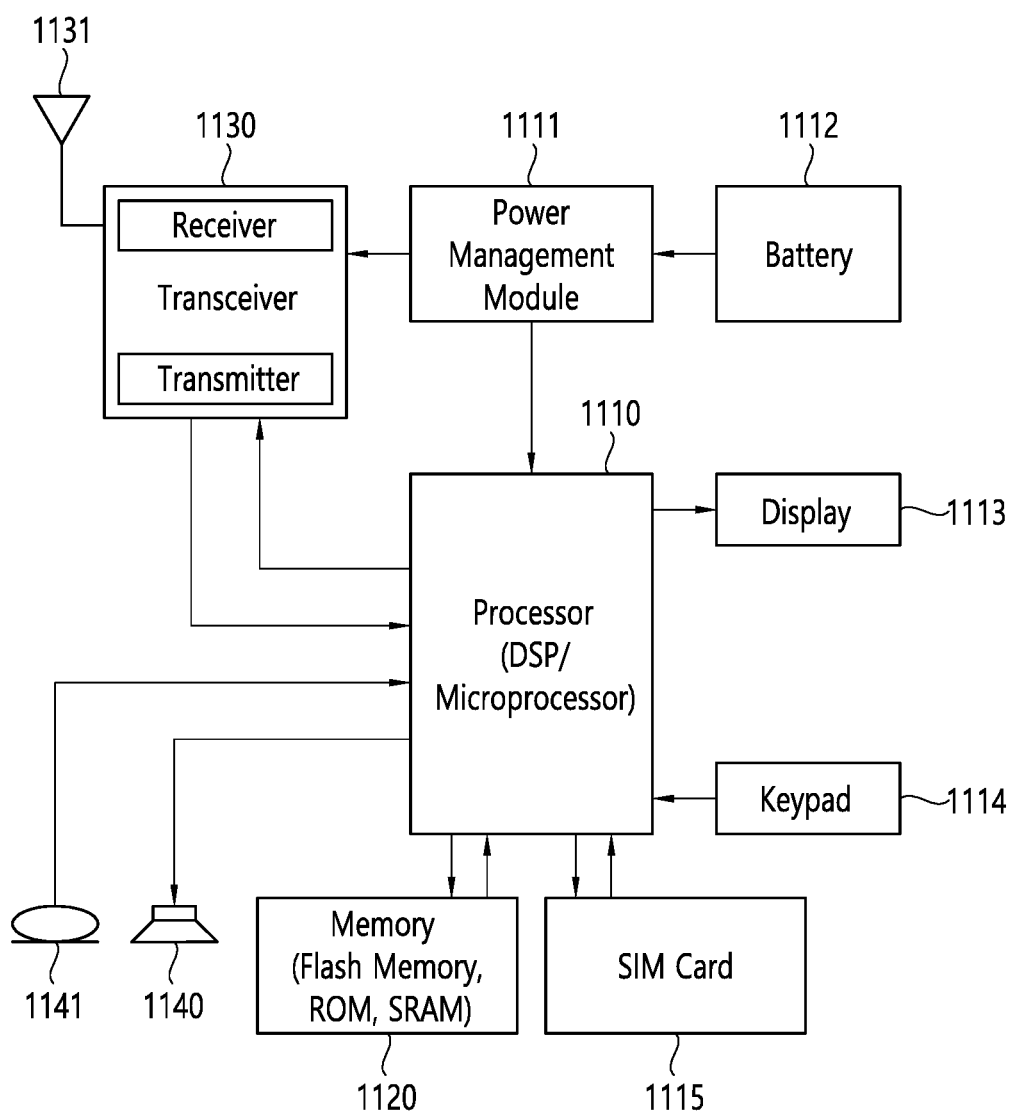
FIG. 11 shows a UE to which the technical features of the present invention can be applied.

FIG. 11 shows a UE to which the technical features of the present invention can be applied.

A UE includes a processor 1110, a power management module 1111, a battery 1112, a display 1113, a keypad 1114, a subscriber identification module (SIM) card 1115, a memory 1120, a transceiver 1130, one or more antennas 1131, a speaker 1140, and a microphone 1141.

The processor 1110 may be configured to implement proposed functions, procedures and/or methods described in this description. Layers of the radio interface protocol may be implemented in the processor 1110. The processor 1110 may include application-specific integrated circuit (ASIC), other chipset, logic circuit and/or data processing device. The processor 1110 may be an application processor (AP). The processor 1110 may include at least one of a digital signal processor (DSP), a central processing unit (CPU), a graphics processing unit (GPU), a modem (modulator and demodulator). An example of the processor 1110 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1100 is configured to perform a congestion level measurement. The congestion level measurement may be performed on at least one of a serving frequency and/or a target frequency. The congestion level measurement may include RSSI measurement and/or a channel occupancy measurement. Furthermore, the congestion level measurement may be related to LBT failures. For example, when N consecutive number of LBT failures happens, it may be considered the congestion level is high.

The processor 1110 is configured to control the transceiver 1130 to receive a conditional mobility configuration associated with multiple target cells from a serving node. The conditional mobility configuration includes a threshold for the congestion level. The conditional mobility configuration associated with multiple target cells may include mobility commands associated with multiple target cells. The conditional mobility configuration may include information on time-to-trigger for the threshold for the congestion level. The conditional mobility configuration may include a threshold for cell quality and information on time-to-trigger for the threshold.

The processor 1100 is configured to perform a mobility towards one target cell among the multiple target cells based on a result of the congestion level measurement and the threshold for the congestion level. The mobility may include a handover to the one target cell and/or a cell addition of the one target cell. The processor 1100 may be configured to apply a mobility command associated with the one target cell among mobility commands associated with the multiple target cells.

The mobility towards the one target cell may be performed when a condition based on the result of the congestion level measurement and the threshold for the congestion level is met.

1) The condition based on the result of the congestion level measurement and the threshold for the congestion level may be met when a congestion level of the target frequency is lower than the threshold for the congestion level and quality of the one target cell on the target frequency is higher than a threshold for cell quality.

2) The condition based on the result of the congestion level measurement and the threshold for the congestion level may be met when congestion levels of all target frequencies, which includes the target frequency and does not include the serving frequency, is higher than the threshold for the congestion level and quality of the one target cell on the serving frequency is higher than a threshold for cell quality.

3) The condition based on the result of the congestion level measurement and the threshold for the congestion level may be met when a congestion level of the serving frequency is higher than the threshold for the congestion level and quality of the one target cell on the target frequency other than the serving frequency is higher than a threshold for cell quality.

4) The condition based on the result of the congestion level measurement and the threshold for the congestion level may be met when a congestion level of the serving frequency is lower than the threshold for the congestion level and quality of the one target cell on the serving frequency is higher than a threshold for cell quality.

The power management module 1111 manages power for the processor 1110 and/or the transceiver 1130. The battery 1112 supplies power to the power management module 1111. The display 1113 outputs results processed by the processor 1110. The keypad 1114 receives inputs to be used by the processor 1110. The keypad 1114 may be shown on the display 1113. The SIM card 1115 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1120 is operatively coupled with the processor 1110 and stores a variety of information to operate the processor 1110. The memory 1120 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1120 and executed by the processor 1110. The memory 1120 can be implemented within the processor 1110 or external to the processor 1110 in which case those can be communicatively coupled to the processor 1110 via various means as is known in the art.

The transceiver 1130 is operatively coupled with the processor 1110, and transmits and/or receives a radio signal. The transceiver 1130 includes a transmitter and a receiver. The transceiver 1130 may include baseband circuitry to process radio frequency signals. The transceiver 1130 controls the one or more antennas 1131 to transmit and/or receive a radio signal.

The speaker 1140 outputs sound-related results processed by the processor 1110. The microphone 1141 receives sound-related inputs to be used by the processor 1110.

According to the embodiment of the present invention shown in FIG. 11, the congestion level can be considered as mobility triggering condition of the conditional mobility. Therefore, the conditional mobility can be performed on unlicensed bands so as to avoid a frequency of which congestion level is high.

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 12:
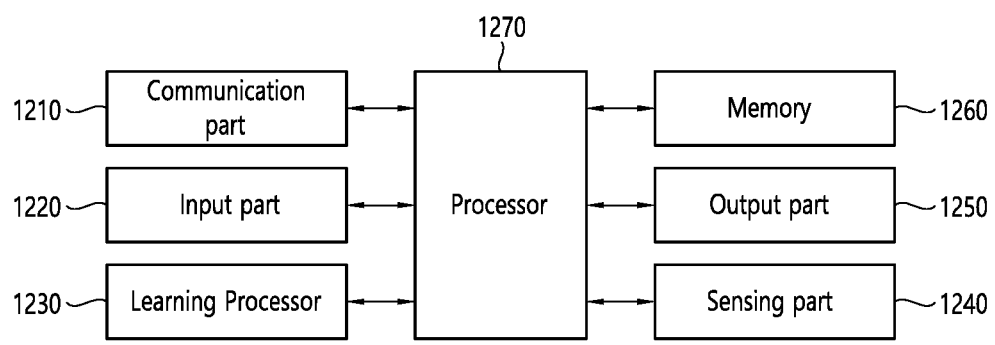
FIG. 12 shows an example of an AI device to which the technical features of the present invention can be applied.

FIG. 12 shows an example of an AI device to which the technical features of the present invention can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc. The output part 1250 may include a display unit for outputting visual information, a speaker for outputting auditory information, and/or a haptic module for outputting tactile information.

The memory 1260 may store data that supports various functions of the AI device 1200. For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing. The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
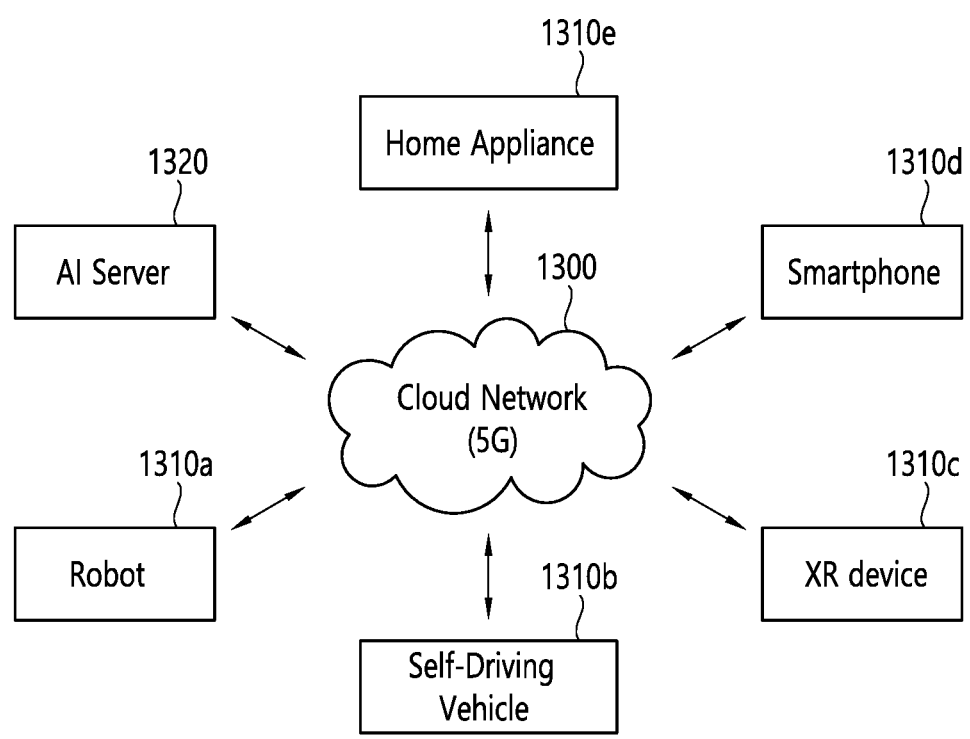
FIG. 13 shows an example of an AI system to which the technical features of the present invention can be applied.

FIG. 13 shows an example of an AI system to which the technical features of the present invention can be applied.

Referring to FIG. 13, in the AI system, at least one of an AI server 1320, a robot 1310a, an autonomous vehicle 1310b, an XR device 1310c, a smartphone 1310d and/or a home appliance 1310e is connected to a cloud network 1300. The robot 1310a, the autonomous vehicle 1310b, the XR device 1310c, the smartphone 1310d, and/or the home appliance 1310e to which the AI technology is applied may be referred to as AI devices 1310a to 1310e.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310a to 1310e and 1320 consisting the AI system may be connected to each other through the cloud network 1300. In particular, each of the devices 1310a to 1310e and 1320 may communicate with each other through a base station, but may directly communicate with each other without using a base station.

The AI server 1300 may include a server for performing AI processing and a server for performing operations on big data. The AI server 1300 is connected to at least one or more of AI devices constituting the AI system, i.e. the robot 1310a, the autonomous vehicle 1310b, the XR device 1310c, the smartphone 1310d and/or the home appliance 1310e through the cloud network 1300, and may assist at least some AI processing of the connected AI devices 1310a to 1310e. The AI server 1300 can learn the ANN according to the machine learning algorithm on behalf of the AI devices 1310a to 1310e, and can directly store the learning models and/or transmit them to the AI devices 1310a to 1310e. The AI server 1300 may receive the input data from the AI devices 1310a to 1310e, infer the result value with respect to the received input data using the learning model, generate a response and/or a control command based on the inferred result value, and transmit the generated data to the AI devices 1310a to 1310e. Alternatively, the AI devices 1310a to 1310e may directly infer a result value for the input data using a learning model, and generate a response and/or a control command based on the inferred result value.

Various embodiments of the AI devices 1310a to 1310e to which the technical features of the present invention can be applied will be described. The AI devices 1310a to 1310e shown in FIG. 13 can be seen as specific embodiments of the AI device 1200 shown in FIG. 12.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device in a wireless communication system, the method comprising:
performing a congestion level measurement to evaluate channel occupancy;
receiving a conditional mobility configuration associated with multiple target cells from a serving node,
wherein the conditional mobility configuration includes (1) information on a threshold for the channel occupancy and (2) information on a time-to-trigger; and
performing a mobility towards one target cell among the multiple target cells based on a condition related to the conditional mobility configuration, which is based on the channel occupancy and the threshold, being met for a duration determined by the time-to-trigger.

2. The method of claim 1, wherein the congestion level measurement is performed on at least one of a serving frequency and/or a target frequency.

3. The method of claim 1, wherein the condition related to the conditional mobility configuration is met, based on (1) a channel occupancy of a target frequency being lower than the threshold for the channel occupancy and (2) a quality of the one target cell on the target frequency being higher than a threshold for cell quality.

4. The method of claim 1, wherein the condition related to the conditional mobility configuration is met, based on (1) channel occupancies of all target frequencies, which includes a target frequency and does not include a serving frequency, are higher than the threshold for the channel occupancy and (2) a quality of the one target cell on the serving frequency being higher than a threshold for cell quality.

5. The method of claim 1, wherein the condition related to the conditional mobility configuration is met, based on (1) a channel occupancy of a serving frequency being higher than the threshold for the channel occupancy and (2) a quality of the one target cell on the target frequency other than the serving frequency is higher than a threshold for cell quality.

6. The method of claim 1, wherein the condition related to the conditional mobility configuration is met, based on (1) a channel occupancy of a serving frequency being lower than the threshold for the channel occupancy and (2) a quality of the one target cell on the serving frequency is higher than a threshold for cell quality.

7. The method of claim 1, wherein the congestion level measurement includes a received signal strength indicator (RSSI) measurement to evaluate the channel occupancy.

8. The method of claim 1, wherein the mobility includes a handover to the one target cell and/or a cell addition of the one target cell.

9. The method of claim 1, wherein the conditional mobility configuration associated with multiple target cells includes mobility commands associated with multiple target cells.

10. The method of claim 9, further comprising applying a mobility command associated with the one target cell among mobility commands associated with the multiple target cells.

11. The method of claim 1, wherein the wireless device is in communication with at least one of a user equipment, a network, and/or autonomous vehicles other than the wireless device.

12. A wireless device in a wireless communication system, the wireless device comprising:
a memory;
a transceiver; and
a processor, operably coupled to the memory and the transceiver,
wherein the wireless device is configured to:
perform, via the processor and the transceiver, a congestion level measurement to evaluate channel occupancy,
receive, via the transceiver, a conditional mobility configuration associated with multiple target cells from a serving node,
wherein the conditional mobility configuration includes (1) information on a threshold for the channel occupancy and (2) information on a time-to-trigger, and
perform a mobility towards one target cell among the multiple target cells based on a condition related to the conditional mobility configuration, which is based on the channel occupancy and the threshold, being met for a duration determined by the time-to-trigger.

13. A processor for a wireless device in a wireless communication system, wherein the processor is configured to:
perform a congestion level measurement to evaluate channel occupancy,
control the wireless device to receive a conditional mobility configuration associated with multiple target cells from a serving node,
wherein the conditional mobility configuration includes (1) information on a threshold for the channel occupancy and (2) information on a time-to-trigger, and
perform a mobility towards one target cell among the multiple target cells based on a condition related to the conditional mobility configuration, which is based on the channel occupancy and the threshold, being met for a duration determined by the time-to-trigger.

* * * * *